US009987700B2

United States Patent
Smith

(10) Patent No.: US 9,987,700 B2
(45) Date of Patent: Jun. 5, 2018

(54) MAGNETICALLY IMPELLED ARC BUTT WELDING METHOD HAVING MAGNET ARRANGEMENT FOR WELDING COMPONENTS HAVING COMPLEX CURVATURES

(71) Applicant: Siemens Energy, Inc., Orlando, FL (US)

(72) Inventor: Grady L. Smith, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 864 days.

(21) Appl. No.: 14/325,406

(22) Filed: Jul. 8, 2014

(65) Prior Publication Data

US 2016/0008909 A1     Jan. 14, 2016

(51) Int. Cl.
| | |
|---|---|
| B23K 11/04 | (2006.01) |
| B23K 11/02 | (2006.01) |
| B23K 9/08 | (2006.01) |
| B23K 101/00 | (2006.01) |

(52) U.S. Cl.
CPC .......... *B23K 9/08* (2013.01); *B23K 2201/001* (2013.01)

(58) Field of Classification Search
CPC .. B23K 2201/001; B23K 9/08; B23K 9/0737; B23K 11/02; B23K 11/04
USPC ......................... 219/104, 117.1, 123, 97, 101
See application file for complete search history.

(56) References Cited

U.S. PATENT DOCUMENTS

| | | | |
|---|---|---|---|
| 3,669,177 A | 6/1972 | Ingalls et al. | |
| 3,732,031 A | 5/1973 | Bowling et al. | |
| 3,878,880 A | 4/1975 | Jones | |
| 4,008,052 A | 2/1977 | Vishnevsky et al. | |
| 4,195,683 A | 4/1980 | Blazek | |
| 4,489,469 A | 12/1984 | Hall | |
| 4,494,287 A | 1/1985 | Cruzen et al. | |
| 4,538,331 A | 9/1985 | Egan et al. | |
| 4,592,120 A | 6/1986 | Egan et al. | |
| 4,728,258 A | 3/1988 | Blazek et al. | |
| 4,869,645 A | 9/1989 | Verpoort | |

(Continued)

OTHER PUBLICATIONS

David H. Phillips, "Magnetically Impelled Arc Butt (MIAB) Welding of Chromium-Plated Steel Tubular Components Utilizing Arc Voltage Monitoring Techniques", Dissertation Presented in Partial Fulfillment of the Requirements for the Degree Doctor of Philosophy in the Graduate School of The Ohio State University, pp. 1-54, Ohio State University (2008).

*Primary Examiner* — Michael G Hoang

(57) ABSTRACT

A magnet arrangement for a magnetically impelled arc butt welding system, wherein the system is used to weld an airfoil to a platform of a gas turbine. The magnet arrangement includes a first plurality of magnets wherein the magnets are located adjacent a first curved airfoil surface and arranged in a first curved shape corresponding to a shape of the first curved airfoil surface. The magnet arrangement also includes a second plurality of magnets wherein the magnets are located adjacent a second curved airfoil surface and arranged in a second curved shape corresponding to a shape of the second curved airfoil surface such that the first plurality of magnets has a different curvature than the second plurality of magnets. The first and second plurality of magnets guide an electric arc of the system along mating surfaces to heat the mating surfaces to enable the airfoil and platform to be forged together.

11 Claims, 4 Drawing Sheets

(56) References Cited

U.S. PATENT DOCUMENTS

| | | | |
|---|---|---|---|
| 4,941,236 A * | 7/1990 | Sherman | A44C 5/2071 24/265 WS |
| 4,955,423 A | 9/1990 | Blazek | |
| 4,961,459 A | 9/1990 | Blazek | |
| 4,987,944 A | 1/1991 | Parks | |
| 5,069,265 A | 12/1991 | Blazek | |
| 5,181,550 A | 1/1993 | Blazek et al. | |
| 5,241,737 A | 9/1993 | Colvin | |
| 5,241,738 A | 9/1993 | Colvin | |
| 5,263,530 A | 11/1993 | Colvin | |
| 5,290,143 A | 3/1994 | Kington et al. | |
| 5,332,022 A | 7/1994 | Colvin | |
| 5,332,360 A | 7/1994 | Correia et al. | |
| 5,377,742 A | 1/1995 | Jarry | |
| 5,678,298 A | 10/1997 | Colvin et al. | |
| 5,797,725 A | 8/1998 | Rhodes | |
| 5,981,083 A | 11/1999 | Colvin et al. | |
| 6,173,491 B1 | 1/2001 | Goodwater et al. | |
| 6,409,473 B1 | 6/2002 | Chen et al. | |
| 6,414,265 B1 * | 7/2002 | Ananthanarayanan | B23K 9/08 219/123 |
| 7,045,220 B2 | 5/2006 | Ishiduka et al. | |
| 7,284,590 B2 | 10/2007 | Liimatainen | |
| 7,798,773 B2 | 9/2010 | Pellet et al. | |
| 2006/0239825 A1 | 10/2006 | Rice et al. | |
| 2007/0090167 A1 * | 4/2007 | Arjakine | B23K 9/23 228/101 |
| 2009/0067987 A1 | 3/2009 | Pellet et al. | |
| 2010/0050434 A1 | 3/2010 | Long | |

* cited by examiner

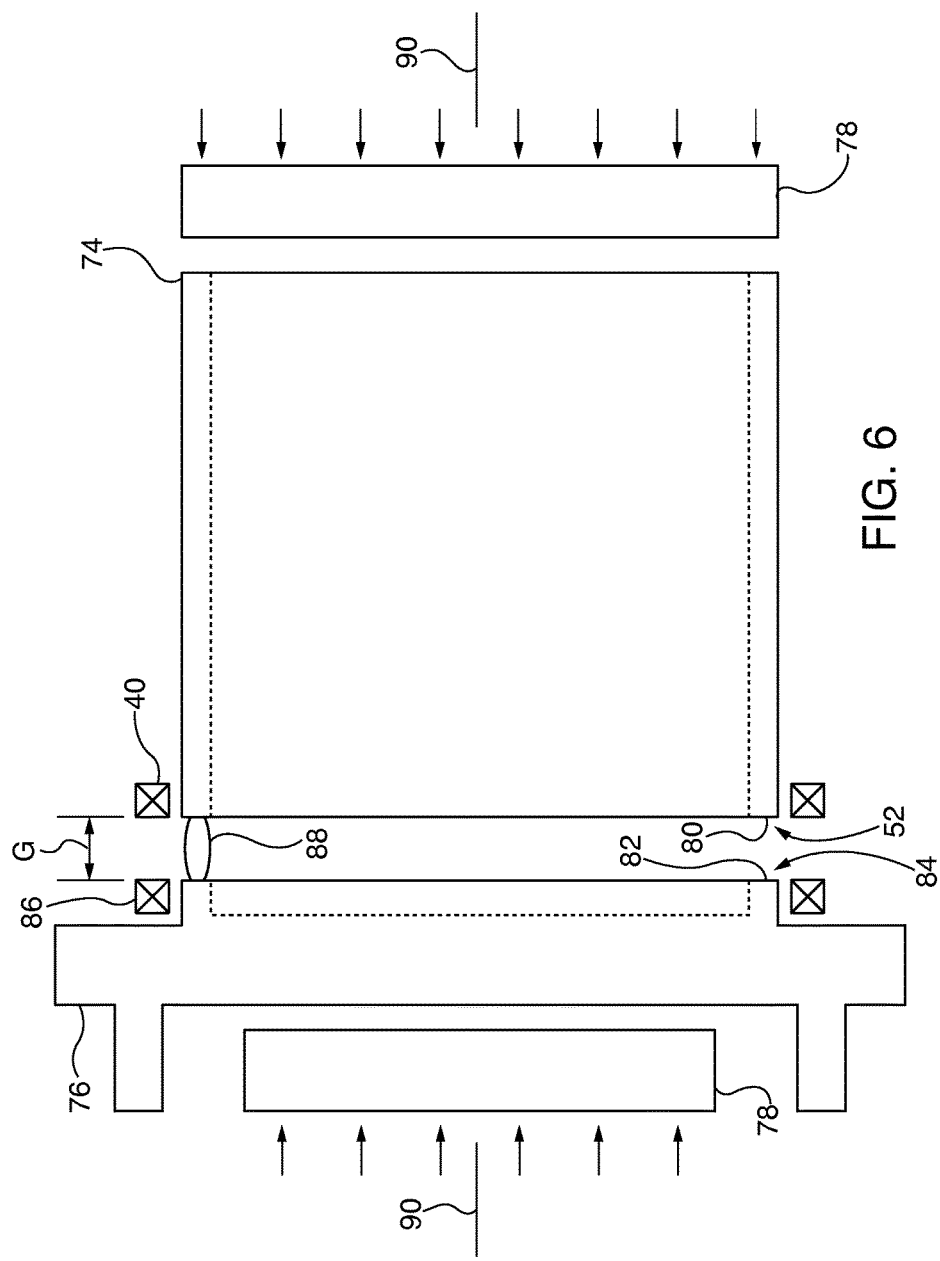

MAGNETICALLY IMPELLED ARC BUTT WELDING METHOD HAVING MAGNET ARRANGEMENT FOR WELDING COMPONENTS HAVING COMPLEX CURVATURES

FIELD OF THE INVENTION

The invention relates to the repair or fabrication of an airfoil and platform assembly for a turbine, and more particularly, to a method for welding an airfoil to a platform of a turbine using a magnetically impelled arc butt welding system that utilizes a first plurality of magnets arranged in a first curved shape and a second plurality of magnets arranged in a second curved shape wherein the first plurality of magnets has a different curvature than the second plurality of magnets.

BACKGROUND OF THE INVENTION

A typical gas turbine engine includes a compressor section, a combustion section and a turbine section. The compressor section provides a compressed air flow to the combustion section where the air is mixed with a fuel, such as natural gas, and ignited to create a hot working gas. The working gas expands through the turbine section where it is directed across rows of blades therein by associated vanes. As the working gas passes through the turbine section, it causes the blades to rotate, which in turn causes a shaft to rotate, thereby providing mechanical work.

A turbine component such as an airfoil is exposed to harsh conditions during normal operation of the turbine. As a result, the airfoil may become worn or damaged and may exhibit erosion, mechanical fatigue, cracks, creep and other undesirable conditions. The existence of such wear or damage is undesirable since it frequently compromises operation of the gas turbine. An airfoil typically extends from a platform having a root portion that is attached a portion of the turbine. The airfoil and platform are fabricated by a casting technique as a one-piece part or structure, i.e. a one-piece part or structure that is integrally or unistructurally formed. Therefore, replacement of the airfoil itself while maintaining the platform portion is difficult.

It is desirable to use magnetically impelled arc butt ("MIAB") welding to install a replacement airfoil. MIAB welding is a forge welding technique that provides a solid-state weld. In MIAB welding, a magnetic field causes movement of an electric arc along respective mating surfaces of first and second components that are to be welded. This uniformly heats the mating surfaces until sufficient plastic deformation occurs to enable forging of the respective mating surfaces. The first and second components are then rapidly brought together under pressure to create a forging action that forms a joint between the first and second components. However, it is difficult to use current MIAB welding techniques to weld components having complex curvatures such as turbine airfoils.

SUMMARY OF INVENTION

A method for welding an airfoil to a platform of a turbine using a magnetically impelled arc butt welding system is disclosed. The method may be used to repair or fabricate an airfoil and platform assembly. The airfoil and platform each include first and second curved surfaces wherein the first and second curved surfaces have different curvatures relative to each other and form airfoil and platform mating surfaces. The method includes providing a first plurality of magnets arranged in a first curved shape corresponding to a shape of the first curved surface. The method also includes providing a second plurality of magnets arranged in a second curved shape corresponding to a shape of the second curved surface such that the first plurality of magnets has a different curvature than the second plurality of magnets. In addition, the method includes generating a first magnetic field with the first plurality of magnets and generating a second magnetic field with the second plurality of magnets. The first and second magnetic fields are then controlled to cause an electric arc to move along the airfoil and platform mating surfaces. Further, the method includes providing a forging action to form a joint between the airfoil and platform.

A magnet arrangement for a magnetically impelled arc butt welding system is also disclosed. The magnet arrangement may be used to weld first and second components together, wherein the first and second components each have first and second component curved surfaces and wherein the first and second component curved surfaces have different curvatures relative to each other. The magnet arrangement includes a first plurality of magnets arranged in a first curved shape corresponding to a shape of the first component curved surface. The magnet arrangement also includes a second plurality of magnets arranged in a second curved shape corresponding to a shape of the second component curved surface such that the first plurality of magnets has a different curvature than the second plurality of magnets.

The respective features of the present invention may be applied jointly or severally in any combination or sub-combination by those skilled in the art.

BRIEF DESCRIPTION OF DRAWINGS

The teachings of the present invention can be readily understood by considering the following detailed description in conjunction with the accompanying drawings, in which:

FIG. 6 shows a setup for welding a replacement airfoil to a platform by using an MIAB welding technique.

To facilitate understanding, identical reference numerals have been used, where possible, to designate identical elements that are common to the figures.

DETAILED DESCRIPTION

Figure 1:
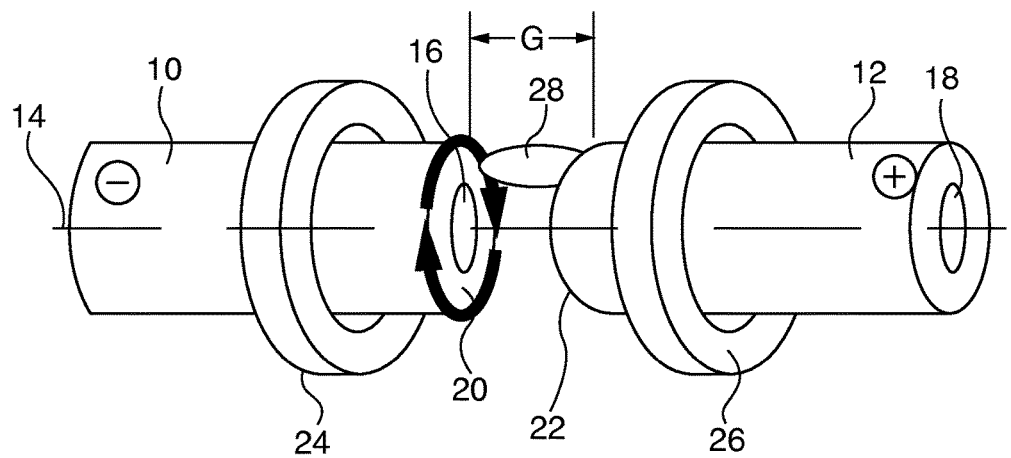
FIG. 1 shows an exemplary arrangement for welding first and second round tubes in accordance with a MIAB welding technique.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

It is desirable to repair a worn or damaged component, such as a turbine component, by removing the turbine component and then using magnetically impelled arc butt ("MIAB") welding to install a replacement turbine component. MIAB welding is a forge welding technique that provides a solid-state weld. Referring to FIG. 1, an arrangement is shown for welding first and second components in accordance with an MIAB welding technique. The first and second components may be exemplary first 10 and second 12 round tubes oriented about a longitudinal axis 14. The first 10 and second 12 tubes include first 16 and second 18 hollow portions that form first 20 and second 22 annular mating surfaces, respectively. The first 20 and second 22 mating surfaces are spaced apart to form an arc gap G. The first 10 and second 12 tubes extend through first 24 and second 26 annular magnet arrangements, respectively. In an MIAB welding technique, an electric arc 28 is generated that extends across the arc gap G and between first 20 and second 22 mating surfaces. The first 24 and second 26 magnets generate a magnetic field that causes circular movement of the electric arc 28 about the axis 14 and along the first 20 and second 22 mating surfaces. This uniformly heats the first 20 and second 22 mating surfaces until sufficient plastic deformation occurs to enable forging of the first 20 and second 22 mating surfaces. The first 10 and second 12 tubes are then rapidly brought together under pressure to create a forging action that forms a joint between the first 10 and second 12 tubes.

Figure 2:
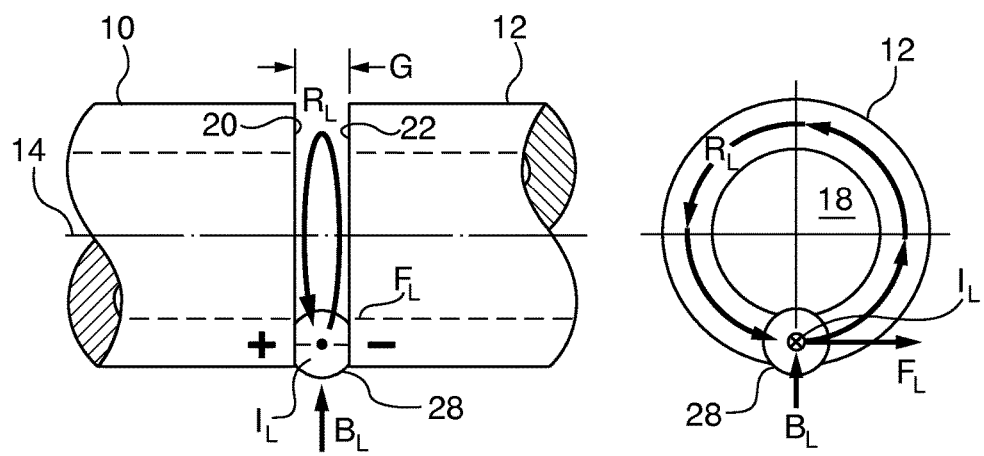
FIG. 2 is a schematic is shown which depicts the forces that cause circular movement of an electric arc.

Referring to FIG. 2, a schematic is shown which depicts the forces that cause movement of the electric arc 28 about the axis 14. During MIAB welding, electric current $I_L$ flowing through the electric arc 28 interacts with an applied magnetic field $B_L$ and a radial component $R_L$ of the magnetic field $B_L$. This interaction causes the generation of an electromagnetic or primary force $F_L$ that causes movement of the electric arc 28 about the axis 14. The primary force $F_L$ is known as a Lorentz force and is defined by:

$$f = J \times B,$$

where f=electromagnetic force density, J=current density, and B=magnetic flux density. The force exerted on the electric current $I_L$ affects acceleration of the rotation of electric arc 28 about the axis 14. Therefore, a speed of the movement of the electric arc 28 may be changed as desired by adjusting parameters such as the strength of the magnetic field $B_L$, the magnitude of the electric current $I_L$ or the width of the arc gap G or a combination of these parameters.

Figure 3:
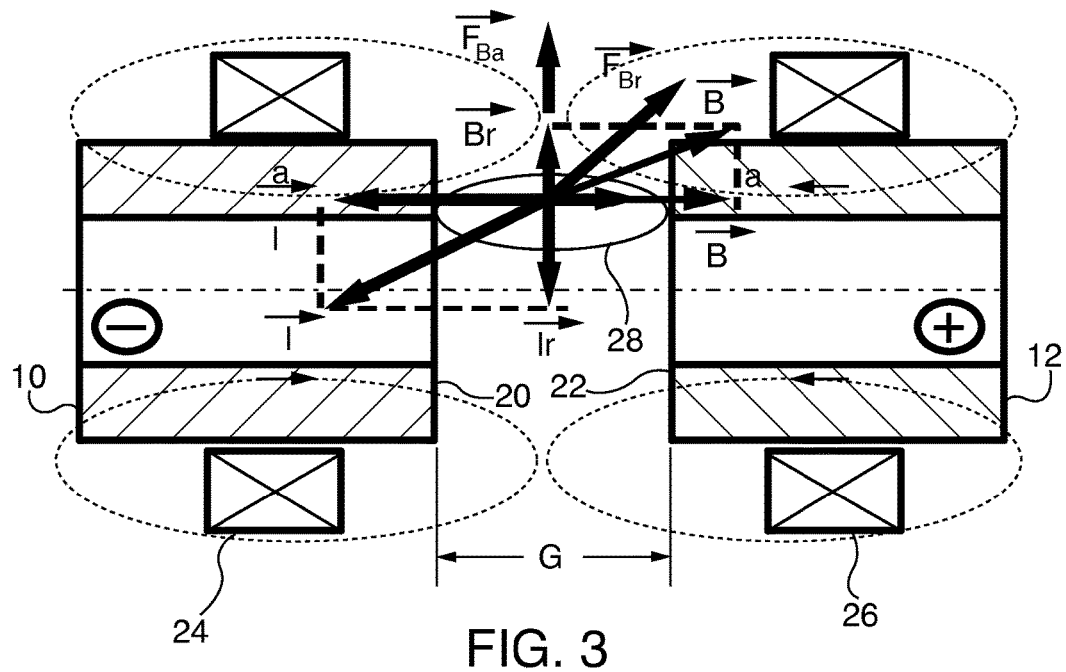
FIG. 3 depicts individual forces generated during MIAB welding.

Referring to FIG. 3, a view of individual forces generated during MIAB welding is shown. The individual forces produce a resultant force that displaces the electric arc 28 during MIAB welding. In FIG. 3, B is an induction of the magnetic field or magnetic flux density; $B_r$ is a radial component; $B_a$ is an axial component; I is an arc current; $I_a$ is an axial component; $I_r$ is a radial component and $F_{Br}$ is a force that affects the displacement of the electric arc 28. Further, $F_{Ba}$ is a secondary force that affects the radial displacement of the electric arc 28. In particular, secondary force $F_{Ba}$ may be used to push the electric arc 28 toward an outer diameter of the first 20 and second 22 mating surfaces.

Figure 4:
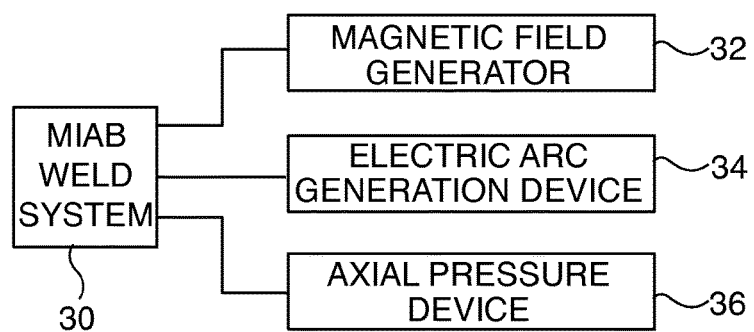
FIG. 4 shows a block diagram for an MIAB welding system.

Referring to FIG. 4, a block diagram for a MIAB weld system 30 is shown. The MIAB system 30 includes a magnetic field generator 32 that generates the magnetic field $B_L$ that interacts with the electric arc 28 to generate primary force $F_L$ as previously described. The magnetic field generator 32 may include a naturally magnetic material, an engineered magnetic material, a permanent magnet, an electromagnet, or a combination thereof. The term "magnet" is used herein to refer to any element, object, device that generates a magnetic field. The MIAB system 30 also includes an electric arc generation device 34 for generating the electric arc 28 that interacts with the magnetic field $B_L$ as previously described. In addition, the MIAB system 30 includes an axial pressure device 36 for holding components to be welded and to create a forging action for forming a joint.

Figure 5:
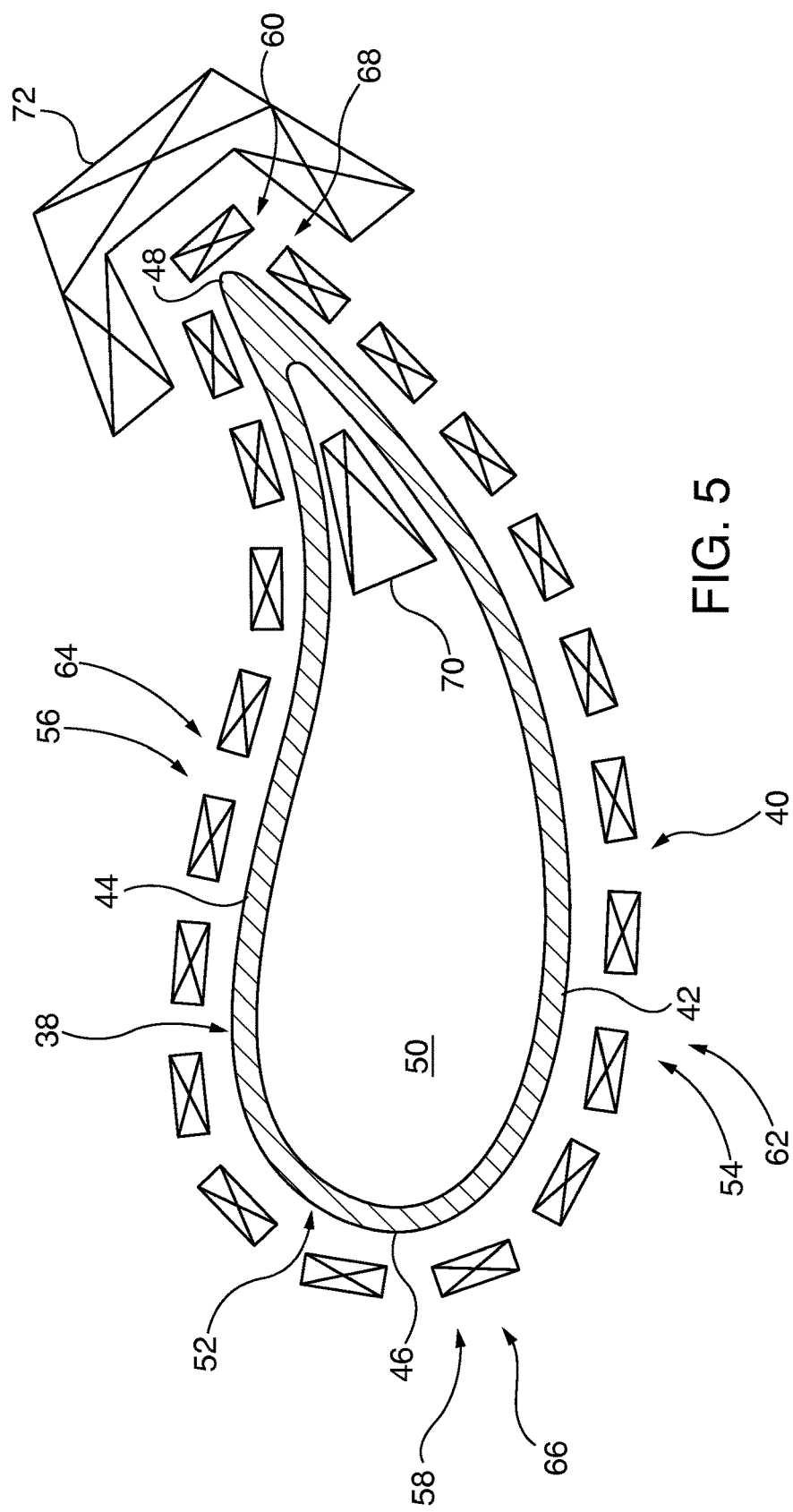
FIG. 5 shows a cross sectional view of an exemplary airfoil and a magnet arrangement configured to weld the airfoil in accordance with the invention.

In accordance with the invention, the magnetic field generator 32 includes at least one magnet arrangement configured to weld components that have more than one curvature, i.e. components that have complex curvatures and are not circular or round shaped. FIG. 5 is a cross sectional view of an exemplary airfoil 38 and a first magnet arrangement 40 configured to weld the airfoil 38. The airfoil 38 includes first 42 and second 44 surfaces, leading 46 and trailing 48 edge surfaces and an internal hollow 50. The first 42 and second 44 surfaces and the leading edge 46 and trailing edge 48 surfaces each have curved shapes whose curvatures are different relative to each other thereby forming an airfoil contour 52. The first magnet arrangement 40 includes a first plurality of magnets 54 arranged adjacent to the first surface 42 and a second plurality of magnets 56 arranged adjacent the second surface 44. In addition, a third plurality of magnets 58 is arranged adjacent the leading edge surface 46 and a fourth plurality of magnets 60 is arranged adjacent the trailing edge surface 48. The first 54, second 56, third 58 and fourth 60 plurality of magnets are arranged in first 62, second 64, third 66 and fourth 68 curved shapes that correspond to the respective curved shape of first 42 and second 44 surfaces and the leading edge 46 and trailing edge 48 surfaces. In an embodiment, each of the magnets 54,56, 58,60 is an electromagnet. It is understood that other magnet configurations may be used to weld other components in a gas turbine that do not have a round shape.

In accordance with the invention, the MIAB system 30 is configured to control or adjust a magnetic field generated by the first magnet arrangement 40 such that an electric arc 88 (see FIG. 6) is generated that follows the airfoil contour 52 at a uniform speed. In an embodiment, each of the magnets in the first magnet arrangement 40 may be independently controlled by the MIAB system 30 such that the electric arc follows the contour 52 as desired. Alternatively, one or more groups of magnets may be controlled by the MIAB system 30 such that the electric arc follows the contour 52. In addition, at least one internal secondary electromagnet 70 may be located within the hollow 50 adjacent the trailing edge surface 48 to help adjust the magnetic field and position of the electric arc 88. Alternatively, at least one external secondary magnet 72 may be located adjacent the fourth plurality of magnets 60 to help adjust the magnetic field and the position of the electric arc 88. In another embodiment, both secondary magnets 70,72 may be used. Further, the internal secondary magnet 70 may be substantially wedge shaped and the external secondary magnet 72 may be substantially U-shaped although it is understood that other shapes may be used. The secondary magnets 70,72 may also be used to strengthen or weaken the magnetic force that is generated in order to control movement of the electric arc 88 along the airfoil contour 52. Additional secondary magnets may be used as needed. Further, a magnet may be used that generates a perpendicular electromagnetic force to ensure that the electric arc moves in a continuous direction.

Referring to FIG. 6, a setup for welding a replacement airfoil 74 to a platform 76 by using an MIAB welding technique is shown. An airfoil that has been worn or damaged is cut at a location adjacent the platform 76 and removed from the platform 76. The replacement airfoil 74 and platform 76 are then located along a central axis 90 and between thrust portions 78 of the axial pressure device 36. The replacement airfoil 74 includes an airfoil mating surface 80 having the airfoil contour 52. The platform 76 includes a platform mating surface 82 having a platform contour 84 that corresponds to the airfoil contour 52. The airfoil mating surface 80 and platform mating surface 82 are separated by the arc gap G. In addition, the platform 76 includes a second magnet arrangement 86 having a first, second, third and fourth plurality of magnets whose shape corresponds to the first 54, second 56, third 58 and fourth 60 plurality of magnets, respectively, of the first magnet arrangement 40. The second magnet arrangement 86 is also controlled by the MIAB system 30.

During MIAB welding, an electric arc 88 is generated that extends across the arc gap G and between the airfoil mating 80 and platform 82 mating surfaces. The first 40 and second 86 magnet arrangements generate a magnetic field that causes movement of the electric arc 88 about the central axis 90. The first 40 and second 86 magnet arrangements are controlled by the MIAB system 30 such that the electric arc 88 follows the airfoil 52 and platform 84 contours. This uniformly heats the airfoil 80 and platform 82 mating surfaces until sufficient plastic deformation occurs to enable the replacement airfoil 74 and platform 76 to be forged together. The replacement airfoil 74 and platform 76 are then rapidly brought together under pressure by the thrust portions 78 to create a forging action for forming a joint between the replacement airfoil 74 and platform 76.

The current invention enables the repair of airfoil and platform assemblies having airfoil portions that are worn or damaged, resulting in cost savings. The current invention may also be used to fabricate new airfoil and platform assemblies from separately manufactured components. For example, a new airfoil, manufactured as a component, could be welded to a new platform, manufactured as a separate component, to form a two piece airfoil and platform assembly rather than a unistructural airfoil and platform assembly. Further, the current invention enables welding of airfoils that are fabricated from a difficult to weld material such as CM 247 LC superalloy material sold by the Cannon-Muskegon Corporation.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A magnetically impelled arc butt welding system that welds a first component to a second component, wherein the first and second components each have first, second, third and fourth component curved surfaces and wherein the first, second, third and fourth component curved surfaces have different curvatures relative to each other, comprising:

a first, second, third and fourth plurality of magnets arranged in first, second, third and fourth curved shapes corresponding to a shape of the first, second, third and fourth component curved surfaces, respectively, of the first and second components wherein the first, second, third and fourth plurality of magnets each have different curvatures relative to each other;

a first magnet located in a hollow of the first component;

a second magnet located adjacent an outside surface of the first component; and an electric arc generation device that generates an electric arc wherein at least one magnetic field generated by the first, second, third and fourth plurality of magnets and the first and second magnets interacts with the electric arc to form a weld joint between the first and second components.

2. The magnet arrangement according to claim 1, wherein the first magnet is substantially wedge shaped.

3. The magnet arrangement according to claim 1, wherein the second magnet is substantially U-shaped.

4. The magnet arrangement according to claim 1, wherein the first, second, third and fourth plurality of magnets include electromagnets.

5. A method of welding an airfoil to a platform of a turbine wherein the airfoil and platform each include first, second, third and fourth curved surfaces and wherein the first, second, third and fourth curved surfaces have different curvatures relative to each other and form an airfoil mating surface and a platform mating surface, comprising:

providing a first, second, third and fourth plurality of magnets arranged in first, second, third and fourth curved shapes corresponding to a shape of the first, second, third and fourth curved surfaces, respectively, of the airfoil and platform wherein the first, second, third and fourth plurality of magnets each have different curvatures relative to each other;

providing a first magnet located in a hollow of the first component;

providing a second magnet located adjacent an outside surface of the first component;

generating respective magnetic fields with each of the first, second, third and fourth plurality of magnets and the first and second magnets;

providing an electric arc that welds the airfoil to the platform;

controlling the magnetic fields to cause the electric arc to move along the airfoil and platform mating surfaces; and providing a forging action to form a joint between the airfoil and platform.

6. The method according to claim 5, wherein the first magnet is substantially wedge shaped.

7. The method according to claim 5, wherein the second magnet is substantially U-shaped.

8. The method according to claim 5, wherein the first, second, third and fourth plurality of magnets include electromagnets.

9. A magnetically impelled arc butt welding system that welds an airfoil to a platform of a turbine, wherein the airfoil and platform each include first, second, third and fourth curved surfaces and wherein the first, second, third and fourth curved surfaces have different curvatures relative to each other and form an airfoil mating surface and a platform mating surface, comprising:

a first, second, third and fourth plurality of magnets arranged in first, second, third and fourth curved shapes corresponding to a shape of the first, second, third and fourth curved surfaces, respectively, of the airfoil and the platform wherein the first, second, third and fourth plurality of magnets each have different curvatures relative to each other;

a first magnet located in a hollow of the airfoil;

a second magnet located adjacent an outside surface of the airfoil; and an electric arc generation device that generates an electric arc wherein at least one magnetic field generated by the first, second, third and fourth plurality of magnets and the first and second magnets interacts with the electric arc to form a weld joint between the airfoil and platform.

10. The magnet arrangement according to claim 9, wherein the first magnet is substantially wedge shaped.

11. The magnet arrangement according to claim 9, wherein the second magnet is substantially U-shaped.

* * * * *